UNITED STATES PATENT OFFICE.

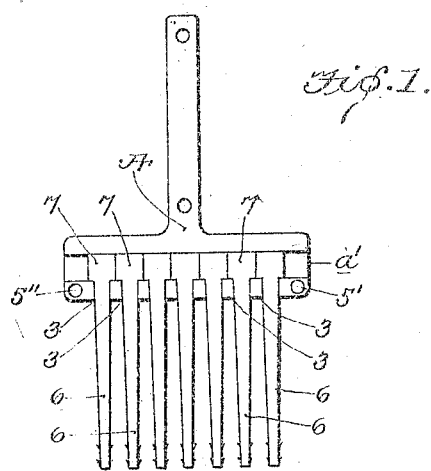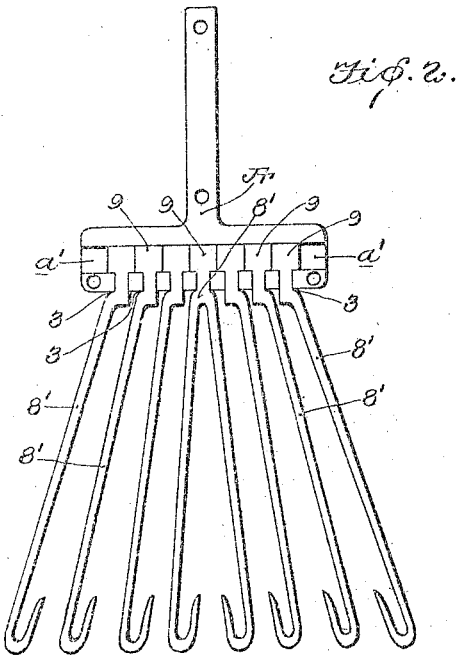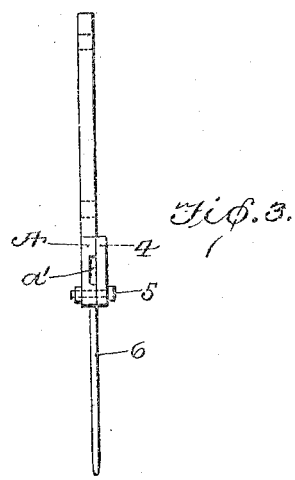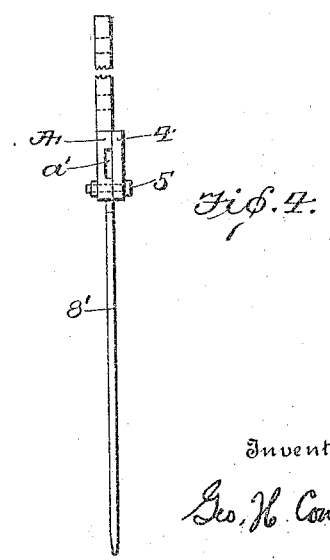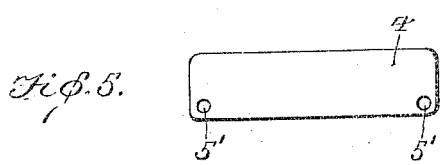

GEORGE H. CONRAD, OF BINGHAMTON, NEW YORK.

FISHING-SPEAR-HANDLE HEAD.

1,234,291.        Specification of Letters Patent.      Patented July 24, 1917.

Application filed July 25, 1916. Serial No. 111,184.

*To all whom it may concern:*

Be it known that I, GEORGE H. CONRAD, a citizen of the United States, and residing at Binghamton, in the county of Broome and State of New York, have invented certain new and useful Improvements in Fishing-Spear-Handle Heads, of which the following is a specification.

My invention relates to an improvement in fishing spear handle heads, in which the fishing spear handle head is provided with removable fishing prongs or hooks, and it has for its object to provide a spear handle head having means for mounting and unmounting one or more removable fishing prongs or mud hooks, without changing handles or changing handle heads, so that the same handle may be readily used for different kinds of fishing, and different uses in fishing. With these objects in view, my invention consists in certain novel features of construction and arrangement of parts as will be hereinafter fully described and pointed out in the claims, reference being had to the accompanying drawings in which—Figure 1 is a front elevation of my device, in a vertical position. Fig. 2 is a front elevation of my device, in modified form, and in vertical position. Fig. 3 is a vertical side view of my device. Fig. 4 is a vertical side view of the modified form of my device shown in Fig. 2. Fig. 5 is a front elevation of the fastening plate.

The same reference characters denote like parts in each of the several figures of the drawings. In carrying out my invention, I provide a spear handle head A mounted in any convenient manner on the spear handle. Across the front of the handle head A I have inlet a channel or recess $a'$ and on the lower side of said channel I have a series of recesses 3, 3, 3, etc., inlet into the same. Mounted across the recess openings I have the plate 4 held against the recess openings by means of the bolts 5, passing through the openings $5'$ in said plate 4 and the spear head A. As a further part of my device I have the spear prongs 6, 6, 6 each of which prongs has the base or shank 7, 7, 7 adapted to meet and fit into and occupy the recesses 3, 3, 3. In a modified form of my device I have the double hooked mud hook $8'$ having the base or foot 9 and on either side of $8'$ I have the group of hooks $8'$, $8'$, $8'$ and each having a base 9 adapted to fit into the recesses 3, 3, 3 etc. In the operation of my device, if I wish to use the spear with the spear prongs 6, 6, 6, I unbolt and remove plate 4 from A and I then insert in the recesses 3, 3, 3 as many of the prongs 6, 6, 6, etc., as desired. I then replace and fasten the plate 4 and the spear head is ready for use. When I wish to fish with mud hooks $8'$ and $8'$, $8'$, $8'$ etc., I again remove plate 4 and take out prongs 6, 6, 6 and reinsert in the recesses 3, 3, 3 the mud prongs $8'$, and $8'$, $8'$, $8'$ etc. I then replace plate 4 and the spear head is ready for mud fishing. Having thus described my invention, what I claim as new and for which I desire Letters Patent is as follows.

1. A fishing spear having a T-shaped head provided with a shank to be secured to a handle, said head being provided intermediate its ends with a longitudinal channel extending from end to end of the head, said head being also provided at its lower side with spaced recesses leading from said channel, spearing prongs having enlarged angular heads adapted to be seated in the longitudinal channel, each prong being provided with a neck occupying one of the spaced recesses, the heads and necks of each prong being of a thickness equal to the depth of the channel and the recesses whereby the upper surfaces of the heads and the necks of each prong will lie flush with the upper surfaces of the head, a cover plate fitting over the head in contact with the head and the portions of the prongs in the channel and recesses and means for securing the cover plate to the head.

2. In a device of the class described, a T shaped head having a shank adapted to be secured to a handle, said head being provided with a longitudinal channel with spaced recesses leading from said channel, spear prongs having T shaped heads adapted to be seated in the longitudinal channel, each prong being provided with a neck occupying one of the spaced recesses, the T shaped heads of each prong being contiguous with the T shaped head of the adjacent prong and a cover plate for retaining the prongs in position in the head.

In testimony whereof I have affixed my signature in the presence of two witnesses.

GEORGE H. CONRAD.

Witnesses:
M. F. TERRY,
A. C. MAHER.

Copies of this patent may be obtained for five cents each, by addressing the "Commissioner of Patents Washington, D. C."